Sept. 2, 1941.  L. MIROW  2,254,903

MOTOR CONTROL SYSTEM

Filed Jan. 4, 1939  2 Sheets-Sheet 1

WITNESSES:

INVENTOR
Lothar Mirow.
BY
ATTORNEY

Patented Sept. 2, 1941

2,254,903

UNITED STATES PATENT OFFICE 2,254,903

MOTOR CONTROL SYSTEM

Lothar Mirow, Berlin-Siemensstadt, Germany, assignor to Westinghouse Electric & Manufacturing Company, East Pittsburgh, Pa., a corporation of Pennsylvania Application January 4, 1939, Serial No. 249,209
In Germany January 15, 1938

5 Claims. (Cl. 172—276)

It is known that in alternating current series motors as they are often used for driving railway vehicles the rotational torque pulsates and that because of this the rotational torque may become a negative value. The manifestation of a negative torque component is particularly undesirable since vibration phenomena are easily produced on the motors, as has appeared in the operation of alternating current vehicles. Furthermore, the manifestation of a negative torque component is also undesirable in view of the fact that thereby the tractive effort produced during starting is considerably decreased.

An investigation of the causes of a manifestation of a negative torque component reveals that this result is produced by the brush short circuit currents which arise and which have, particularly during starting, considerable values. The consequence of the brush short circuit currents is that a considerable phase displacement between the main field of the machine and the current flowing through the armature arises.

An object of the present invention, generally stated, is to improve the efficiency of operation of an alternating current series motor, particularly during starting.

A more specific object of the invention is to so influence the phase position of the main field during starting that the main field and the armature current have essentially the same phase position.

Other objects of the invention will be explained fully hereinafter or will be apparent to those skilled in the art.

In accordance with the invention, the foregoing objects are obtained by providing a shunt circuit for the main field winding and by so influencing the current in the main field winding, and with it the main field, as a consequence of the proportioning of the effective resistance of the shunt circuit, as well as the main field winding, that the phase position of the main field is approximately the same as that of the current flowing through the armature of the motor.

For a fuller understanding of the nature and objects of the invention, reference may be had to the following detailed description, taken in conjunction with the accompanying drawings, in which.

Figure 1A:
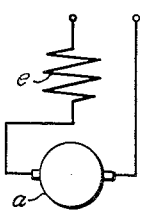
Figure 1A is a diagram showing the usual circuit of a single phase series motor.
Figure 1B:
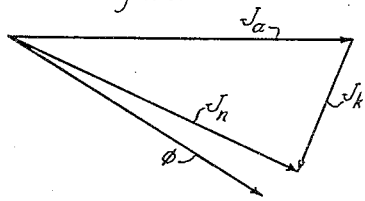
Fig. 1B is a vector diagram of the circuit shown in Fig. 1A.

Referring first to Fig. 1A, which illustrates the usual circuit of a single phase series motor, the reference character $a$ designates the armature of the motor and $e$ the exciting winding connected in series therewith. In the commutating zone the coils which are at any time disposed under the brushes are short circuited during the commutation. Therefore, they act like the secondary of a transformer for which the field coils are the primary and a current is induced in these coils which is substantially 90 degrees out of phase with the field flux. For the circuit shown in Fig. 1A there results the vector diagram illustrated in Fig. 1B. In this diagram $J_a$ represents the current flowing through the armature and $J_k$ signifies the current corresponding to the brush short circuit current. Of the sum of these currents there results the ideal exciting current $J_n$ which determines the origin of the field of the machine. It will be seen that the current $J_n$ is considerably displaced in phase with reference to the armature current $J_a$. Because of the influence of the iron loss currents, the phase displacement of the field with reference to the armature current is even more increased, as shown in the drawing by the vector $\phi$ which indicates the phase position of the actual field present in the machine.

Figure 2A:
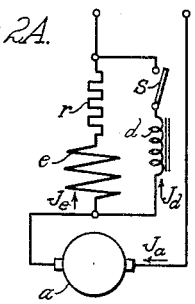
Fig. 2A is a diagram of a motor circuit showing an embodiment of the present invention.

Fig. 2A illustrates a circuit in which the means in accordance with the invention is utilized to bring the phase position of the main field in conformity with that of the armature current. An ohmic resistance $r$ is connected in series with the field winding $e$ which is in series with the armature $a$. In addition a reactor $d$ is connected in parallel to the field winding $e$ and the ohmic resistance $r$. The current flowing through the armature is identified by $J_a$, the exciting current of the field winding by $J_e$ and the current in the shunt branch of the reactor by $J_d$.

Figure 2B:
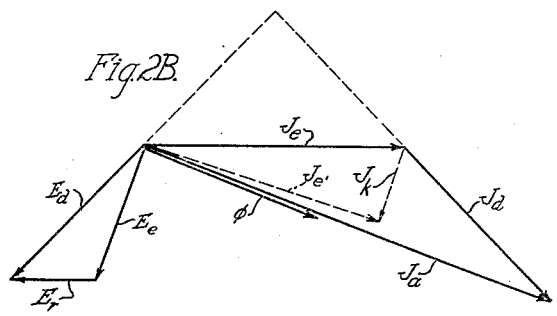
Fig. 2B is a vector diagram of the circuit shown in Fig. 2A.

In the vector diagram illustrated in Fig. 2B the electrical relationships which result in the circuit shown in Fig. 2A are illustrated. The armature current $J_a$ is the resultant of the field current $J_e$ and the reactor current $J_d$. The exciting current $J_e$ has a large phase displacement because of the parallel connection of the reactor $d$ and the series connection of the resistance $r$ with the field winding $e$. Also taking into consideration the brush short circuit currents $J_k$ shown dotted there results the ideal exciting current $J_{e'}$, also shown dotted, and with it a field $\phi$ which, taking into consideration the iron losses, has practically the same phase position as the armature current $J_a$. Perpendicular to the vector for the field $\phi$ there is the potential vector $E_e$ which causes the potential impressed on the field winding. $E_r$ signifies the ohmic potential drop in the resistance $r$ which has the same phase position, but the reverse polarity, as the current $J_e$. The sum of $E_e$ and $E_r$ is $E_d$, the potential impressed on the reactor $d$. This potential component must be perpendicular to the current vector $J_d$.

Figure 3A:
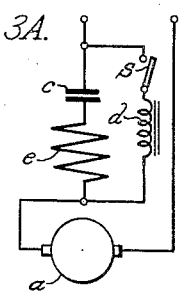
Figs. 3A and 3B illustrate the circuit connections and vector diagram, respectively, of another embodiment of the invention.

Fig. 3A shows a similar circuit in which a condenser $c$ is connected in series with the field winding $e$ and a reactor $d$ is connected in parallel to these two elements.

Figure 3B:
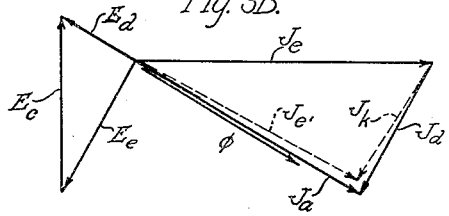

Fig. 3B is the corresponding vector diagram. Of the sum of the exciting current $J_e$ and the reactor current $J_d$ there again results the armature current $J_a$. $J_e$ is so displaced in phase with reference to $J_a$, as a consequence of the use of the reactor and the condenser, that the field $\phi$ actually produced by $J_e$, which field is very much displaced in phase with reference to the exciting current as a consequence of the brush short circuit currents, has the same phase position as $J_a$. Perpendicular to the field $\phi$ there is the vector of the exciting potential $E_e$ which, together with the condenser potential $E_c$, which is perpendicular to the vector $J_e$, give the reactor potential $E_d$. The reactor potential $E_d$ is again perpendicular to the reactor current $J_d$. The condenser $c$ may with advantage be connected through a transformer.

Under certain circumstances it may be advantageous to attain the desired influencing of the phase position of the main field with the aid of additional potentials which influence the current distribution in the circuit branches consisting of the field winding and a shunt circuit.

Figure 4:
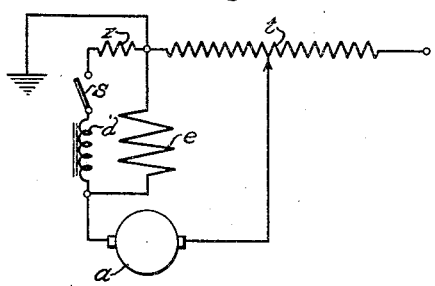
Fig. 4 is a diagram of another form of the invention.

Fig. 4 illustrates such a circuit in which $t$ is the main transformer to which the motor armature $a$ is connected. The field winding $e$ is connected in series with the armature in the usual manner. The reactor $d$ is connected in parallel with the field winding $e$ as previously shown. In the circuit branch of the reactor $d$ there is in addition the portion $z$ of the transformer winding $t$ which is connected behind the ground zero point of the transformer. Through the part of the winding $z$ an additional potential component is produced in the circuit branch of the reactor $d$.

Figure 5A:
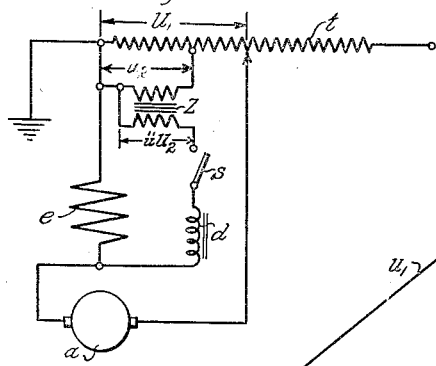
Figs. 5A and 5B show the circuit connections and vector diagram, respectively, of another embodiment of the invention.

Fig. 5A shows an improved arrangement which differs from the circuit shown in Fig. 4 essentially by the provision of a special auxiliary transformer Z having two windings, the primary winding of which is subjected to the potential $u_2$ of the main transformer $t$ while the secondary winding is connected in series with the reactor $d$ which is connected in parallel to the field winding $e$. $U_1$ signifies the potential tapped from the transformer and applied to the motor.

Figure 5B:
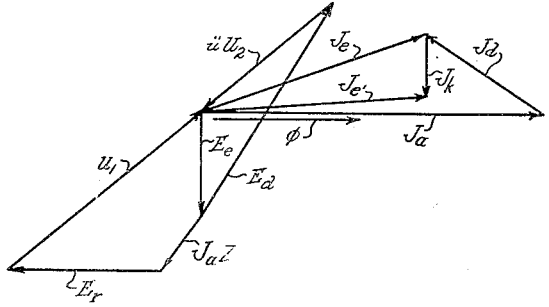

Fig. 5B shows the associated vector diagram. With regard to the current portion of the diagram there is, in general, no difference from the previous diagrams, therefore, further explanation is believed to be superfluous. The potential $E_e$ on the field winding results from the sum of the reactor potential $E_d$, which is perpendicular to the current $J_d$, and the potential $\ddot{u}$. $U_2$ which is impressed on the secondary winding of the auxiliary transformer. Here $\ddot{u}$ is the transformation ratio of the auxiliary transformer Z. The potential diagram for the motor is also plotted in Fig. 5B. The potential vector $U_1$ is here composed of the sum of the potentials $E_e$ on the field winding, the total potential drop $J_a.Z$ on the motor and the rotational potential $E_r$ on the motor.

Figure 6A:
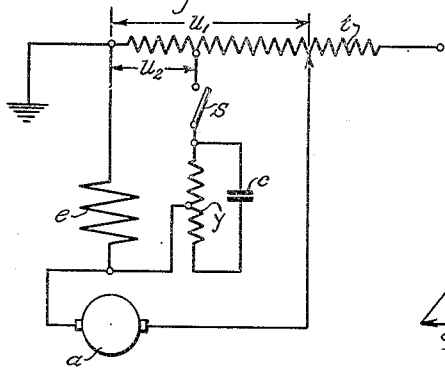
Figs. 6A and 6B show the motor circuit and vector diagram, respectively, of still another embodiment of the invention.

A further improved circuit in which an additional potential is applied to the shunt circuit for the field winding is illustrated in Fig. 6A. In this circuit the condenser $c$ is connected in parallel to the field winding $e$ through a transformer $y$. The condenser circuit is here so connected to the main transformer $t$ that in the shunt circuit a portion of the main transformer winding with the potential $U_2$ is connected.

Figure 6B:
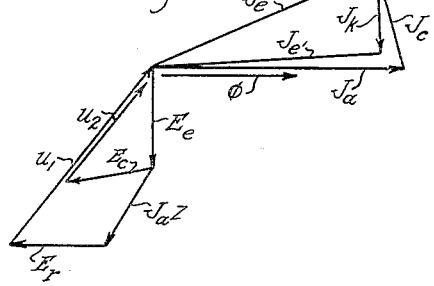

Fig. 6B illustrates the associated vector diagram for the circuit shown in Fig. 6A and it is believed that it will be clearly understood from the foregoing descriptions without further explanation.

Figure 7:
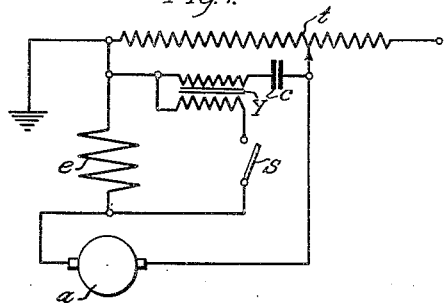
Fig. 7 is a diagram showing the circuit connections of a different embodiment of the invention.

Fig. 7 shows finally a similar circuit in which the condenser $c$ is connected on the primary side of the two-winding transformer Y. The primary circuit of the transformer Y, which on its secondary side is connected in shunt to the exciting winding is also supplied with the same potential as the motor itself. The circuit may also be so selected that the additional potential in the parallel circuit of the field winding varies in accordance with any desired law, for example, is decreased from a maximum value.

As already mentioned, the circuit connections according to the invention will function to improve the starting operation of the motor. As soon as the motor is started, the circuit may be so changed that a potential influencing of the phase position of the main field no longer exists, and the influencing means provided in accordance with the invention are ineffective. For this purpose suitable switches $s$ are provided.

In addition to the avoidance of large negative torque components, the arrangement in accordance with the invention has the important advantage that the currents arising at starting are considerably decreased by reason of the avoidance of the weakening of the torque of the motor. Also, with reference to commutation the arrangement in accordance with the invention has considerable advantage because the rotating field component serving for suppressing the transformer potential now has the proper phase position with reference to the transformer potential as a consequence of the influencing of the phase position of the main field.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a motor control system, in combination, an alternating current series motor having an armature winding and a main field exciting winding, a shunt circuit paralleling all of said field winding, reactive means in said shunt circuit for so controlling the relative impedances of the field winding circuit and the shunt circuit that the main field has substantially the same phase position as the current flowing through the armature, and switching means in said shunt circuit for controlling the energization of said reactive means.

2. In a motor control system, in combination, an alternating current series motor having an armature winding and a main field exciting winding, an external ohmic resistance connected in series with the field winding, a reactor connected in parallel to said resistance and all of said field winding, and switching means for controlling the energization of said reactor.

3. In a motor control system, in combination, an alternating current series motor having an armature winding and a main field exciting winding, a condenser connected in series with the field winding, a reactor connected in parallel to said condenser and said field winding exclusively of said armature winding, and a switch for opening the parallel circuit through said reactor.

4. In a motor control system, in combination, an alternating current series motor having an armature winding and a main field exciting winding, a transformer through which energy is supplied to the motor, a reactor connected in parallel to the field winding, a portion of the main winding of said transformer being connected in series with all of said reactor in said parallel circuit to the field winding, and a switch for opening said parallel circuit.

5. In a motor control system, in combination, an alternating current series motor having an armature winding and a main field exciting winding, a shunt circuit paralleling all of said field winding, and reactive means in said shunt circuit for so controlling the relative impedances of the field winding circuit and the shunt circuit that the main field has substantially the same phase position as the current flowing through the armature, and switching means for opening said shunt circuit.

LOTHAR MIROW.